United States Patent
Von Drach et al.

(10) Patent No.: US 7,195,694 B2
(45) Date of Patent: Mar. 27, 2007

(54) REINFORCING AND/OR PROCESS FIBRES BASED ON VEGETABLE FIBRES AND PRODUCTION THEREOF

(75) Inventors: Volker Von Drach, Munich (DE); Karl-Heinz Hensel, Seeshaupt (DE)

(73) Assignee: Ecco Gleittechnik GmbH, Seeshaupt (DE)

( * ) Notice: Subject to any disclaimer, the term of this patent is extended or adjusted under 35 U.S.C. 154(b) by 0 days.

(21) Appl. No.: 10/951,621

(22) Filed: Sep. 29, 2004

(65) Prior Publication Data

US 2005/0170144 A1    Aug. 4, 2005

Related U.S. Application Data

(63) Continuation of application No. 09/926,432, filed as application No. PCT/EP00/03953 on May 3, 2000, now abandoned.

(30) Foreign Application Priority Data

May 3, 1999   (DE) ................................ 199 20 225

(51) Int. Cl.
D06N 7/04   (2006.01)
(52) U.S. Cl. ........................... 162/9; 428/359; 428/364
(58) Field of Classification Search ................ 428/364, 428/373, 359; 523/149, 152, 157; 162/100, 162/9, 108, 109; 188/251; 241/26, 1, 5, 241/15; 19/9
See application file for complete search history.

(56) References Cited

U.S. PATENT DOCUMENTS

| | | | | |
|---|---|---|---|---|
| 4,197,223 A | * | 4/1980 | Bartram | 260/17.2 |
| 4,439,328 A | * | 3/1984 | Moity | 252/8.5 LC |
| 4,548,677 A | * | 10/1985 | Schneider et al. | 162/139 |
| 4,663,060 A | * | 5/1987 | Holinski | 508/108 |
| 4,747,550 A | | 5/1988 | Jackering | 241/55 |
| 4,811,908 A | * | 3/1989 | Galati | 241/21 |
| 4,857,244 A | * | 8/1989 | Berger | 264/24 |
| 5,232,779 A | * | 8/1993 | Spehner | 428/379 |
| 5,240,766 A | * | 8/1993 | Foster | 428/297.4 |
| 5,290,627 A | * | 3/1994 | Ikuta | 428/251 |
| 5,354,606 A | * | 10/1994 | Kjelby et al. | 442/321 |
| 5,417,228 A | * | 5/1995 | Baldwin et al. | 131/349 |
| 5,494,748 A | * | 2/1996 | Spehner | 428/379 |
| 5,508,109 A | * | 4/1996 | Patil et al. | 428/364 |
| 6,076,752 A | * | 6/2000 | Paradowski et al. | 241/16 |
| 6,079,647 A | * | 6/2000 | Leduc et al. | 241/73 |
| 6,133,438 A | * | 10/2000 | Kolla et al. | 524/9 |
| 6,220,405 B1 | * | 4/2001 | Kesavan et al. | 188/251 A |
| 6,534,565 B1 | * | 3/2003 | Gardner et al. | 523/149 |

FOREIGN PATENT DOCUMENTS

| | | |
|---|---|---|
| DE | 3328769 A1 | 8/1983 |
| DE | 3543470 A1 | 6/1987 |

(Continued)

*Primary Examiner*—Rena Dye
*Assistant Examiner*—Camie S. Thompson
(74) *Attorney, Agent, or Firm*—Bacon & Thomas PLLC

(57) ABSTRACT

The present invention relates to reinforcing and/or process fibres based on vegetable fibres whose elementary fibres are fibrillated and to a process for their production. The reinforcing and/or process fibres are characterized in that the elementary fibres have a fibril content greater than 3 area percent and less than 50 area percent. The process is characterized in that the fibre material is ground in an eddied air grinder.

10 Claims, 4 Drawing Sheets

FOREIGN PATENT DOCUMENTS

| | | |
|---|---|---|
| DE | 42 11 010 A | 10/1992 |
| DE | 90 07 726 U | 1/1995 |
| DE | 90 07 773 U | 10/1995 |
| DE | 94 13 955 U | 1/1996 |
| DE | 196 26 557 A1 | 7/1996 |
| DE | 197 03 634 A1 | 1/1997 |
| DE | 19815992 * | 4/1998 |
| EP | 0 000 840 A | 2/1979 |
| EP | 0 654 616 A | 5/1995 |
| EP | 0 695 887 A1 | 2/1996 |

* cited by examiner

REINFORCING AND/OR PROCESS FIBRES BASED ON VEGETABLE FIBRES AND PRODUCTION THEREOF

This application is a continuation application of U.S. application Ser. No. 09/926,432, filed Dec. 31, 2001 now abandoned (of which the entire disclosure of the prior application is hereby incorporated by reference), which is a 371 of PCT/EP00/03953, filed May 3, 2000.

The present invention relates to reinforcing and/or process fibres based on vegetable fibres whose elementary fibres are fibrillated and to a process for their production.

Vegetable fibres include for example bast fibres which are obtained from the stems of fibre plants. Bast fibres are composed of fibres in which plural elementary fibres, which constitute individual cells, are combined into fibre bundles. Fibrillation is a process where an elementary fibre, which typically is between 10 μm and 30 μm in diameter, is split open laterally into finer fibres which are known as fibrils. Such fibrils are typically less than 300 μm in length and between 1 μm and 5 μm in diameter. The fibrils formed in the process of fibrillation generally remain attached to the fibre at one end.

In addition, the stems of bast fibre plants comprise shives. Shives are the woody fibre plant constituents which do not contain bast fibres.

Figure 4:
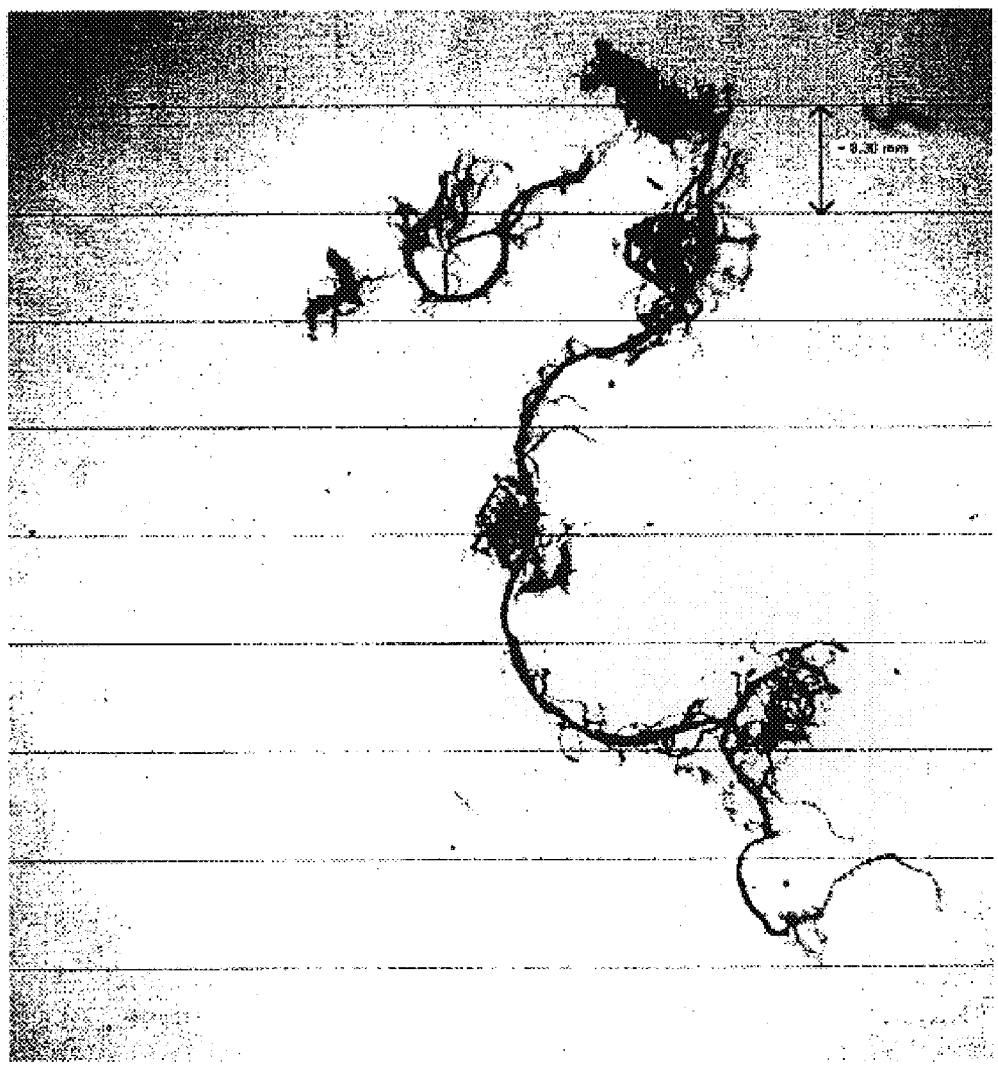

It is customary to produce reinforcing or process fibres on the basis of synthetic aramid fibres, which are fibrillated using specific mills. FIG. 4 is a micrograph of a fibrillated aramid fibre. In macroscopic terms, fibrillation confers a woolly habit on a fibre.

When used as process fibres, fibrillated aramid fibres have favourable effects on the processing properties in composite materials of the chemical industry, for example in friction linings and gaskets. Aramid fibres are notable for the particularly high fibril content which can be achieved in fibrillation.

However, fibrillated aramid fibres are disadvantageous in that they are very costly and may release toxic decomposition products, for example hydrocyanic acid, at high temperatures, so that their disposal is problematical.

There are also reinforcing or process fibres that are based on vegetable fibres or organic natural fibres. Such fibres are described in DE 19 703 634 A1. The fibres described therein can be obtained by using ultrasound to release them from the assembly in the stems and to individualize them. It is known for such fibres to be wet ground. However, this has hitherto provided a different fibre variety, namely a very short, attrited elementary fibre. Such a wet grinding process does not provide the typical construction of a fibrillated fibre, which comprises elementary fibres having an average diameter of about 15 μm and, attached thereto at one end, fibrils having an average diameter of less than 5 μm. However, these wet-ground fibres do have a relatively high Blaine-Dyckerhoff specific surface area, explained hereinbelow. But the reason for this is not a high degree of fibrillation, as defined herein, but the substantial shortening of the fibres. Hitherto, fibres based on vegetable fibres have thus not been able to substitute for synthetic fibrillated aramid fibres.

It is an object of the present invention to provide reinforcing and/or process fibres which are based on vegetable fibres and can substitute for synthetic fibrillated aramid fibres.

It is further an object of the present invention to provide reinforcing and/or process fibres based on vegetable fibres that are readily blendable with fibrillated aramid fibres.

It is further an object of the present invention to provide a process for their production.

This object is achieved according to the invention by reinforcing and/or process fibres based on vegetable fibres whose elementary fibres are fibrillated, wherein the elementary fibres have a fibril content greater than 3 area percent and less than 50 area percent. Given such a high fibril content, the reinforcing and/or process fibres of the invention can substitute for fibrillated aramid fibres in many sectors.

The fibres of the invention can be based on flax, hemp, sisal, jute or ramie fibres for example. The use of such vegetable fibres is advantageous in that they are substantially less costly than synthetic aramid fibres and do not give rise to ecologically problematical products whatever at high temperatures or at disposal.

Furthermore, the fibres of the invention can be blended with fibrillated aramid fibres in order that economically more attractive reinforcing and/or process fibres may be produced in this way. The weight fraction of the fibres according to the invention in such blends can be between 10% and 90%, a weight fraction between 50% and 80% being preferred.

Furthermore, the fibres according to the invention can either be substantially free of shives or consist of a mixture of fibrillated fibres and shives. It is advantageous either to keep the shives fraction below 10% by weight or to choose a high shives content between 25% by weight and 75% by weight, depending on the application. Such a fibre-shives mixture has the advantage of being less costly than pure fibre material. Furthermore, such a mixture is advantageous in some applications, for example in friction linings where additional fillers are desired.

Advantageously, an additive for friction linings can contain the fibres according to the invention, preferably at a weight fraction between 5 and 95% by weight, together with tin sulphides.

The invention advantageously further provides a friction lining or a gasket which each comprise fibres according to the invention, the friction lining preferably containing tin sulphides in an amount of 0.5 to 10% by weight, based on the total amount of lubricating materials.

The inventive process for producing reinforcing and/or process fibres based on vegetable fibres comprises grinding the fibre material in an eddied air grinder. The use of such a grinder provides particularly good fibrillation of the elementary fibres of the vegetable fibres. The starting material is advantageously ultrasonicated fibre material, which may if appropriate still include shives.

Figure 1:
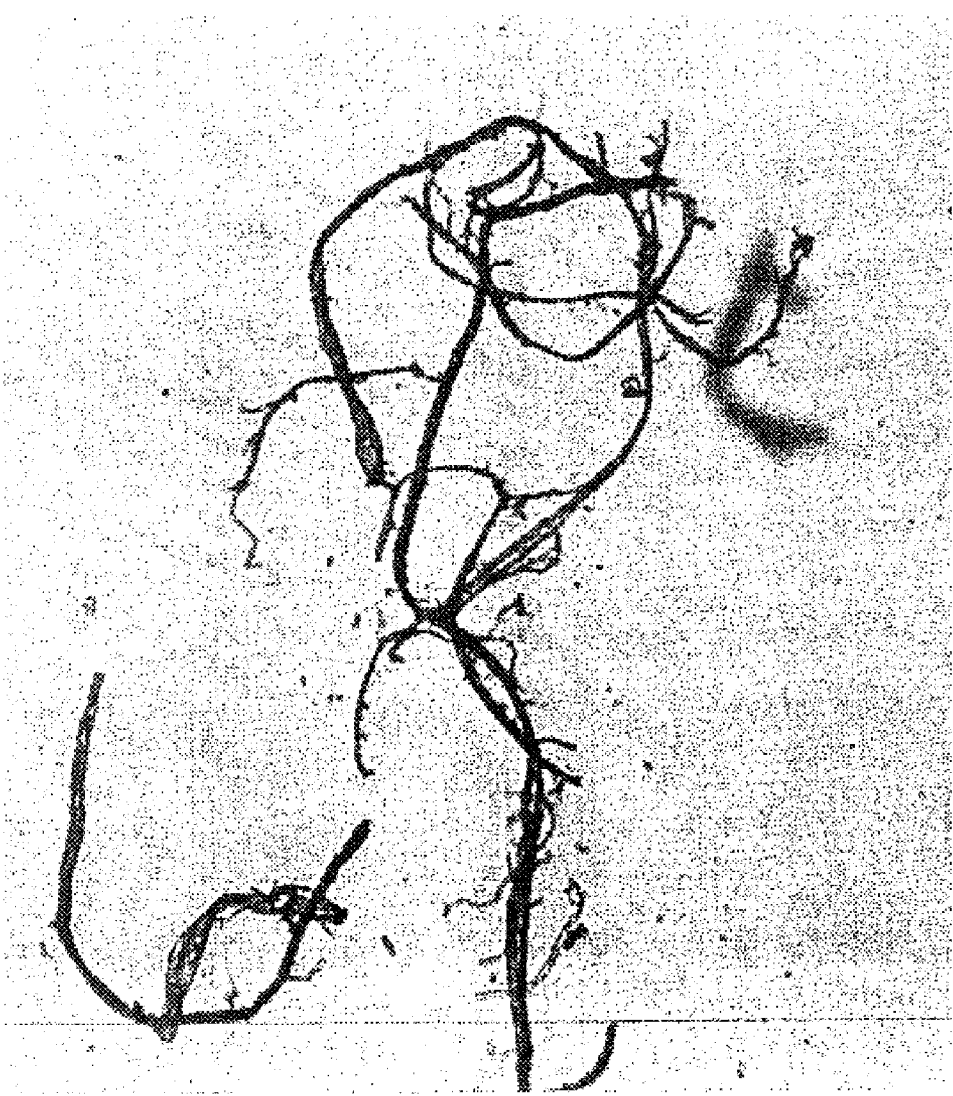
Figure 2:
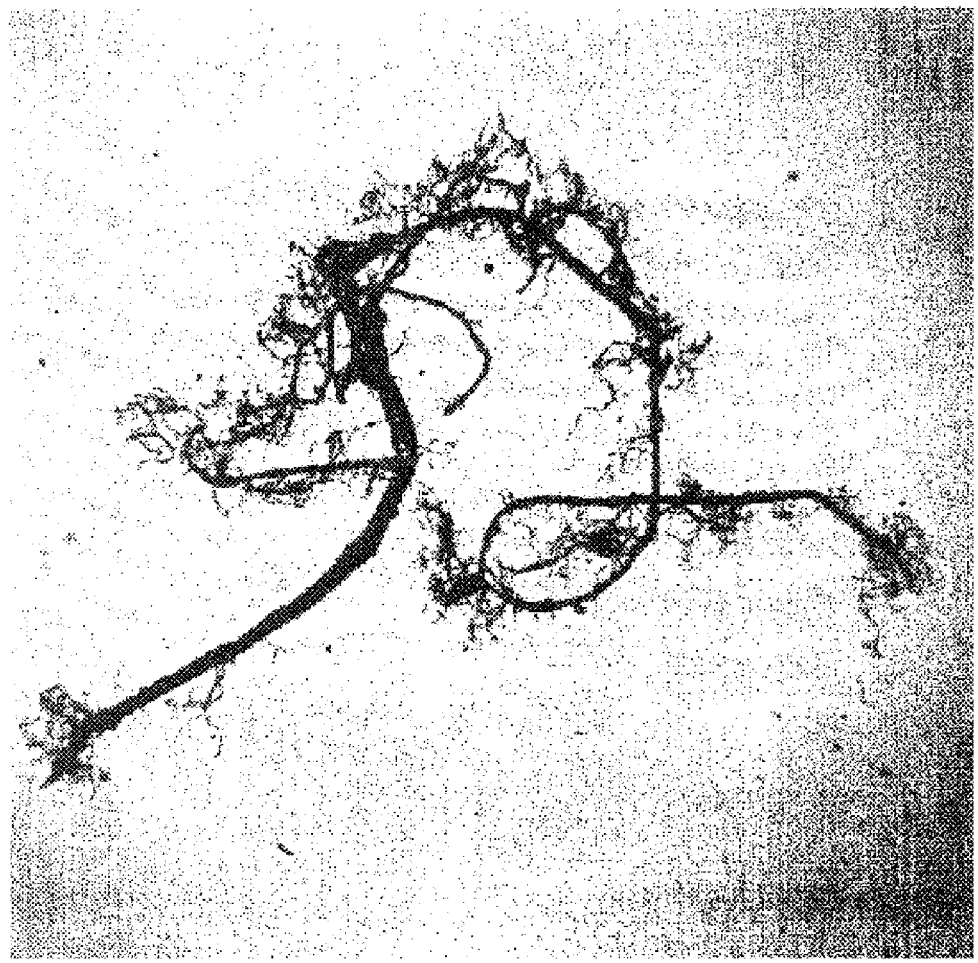
Figure 3:
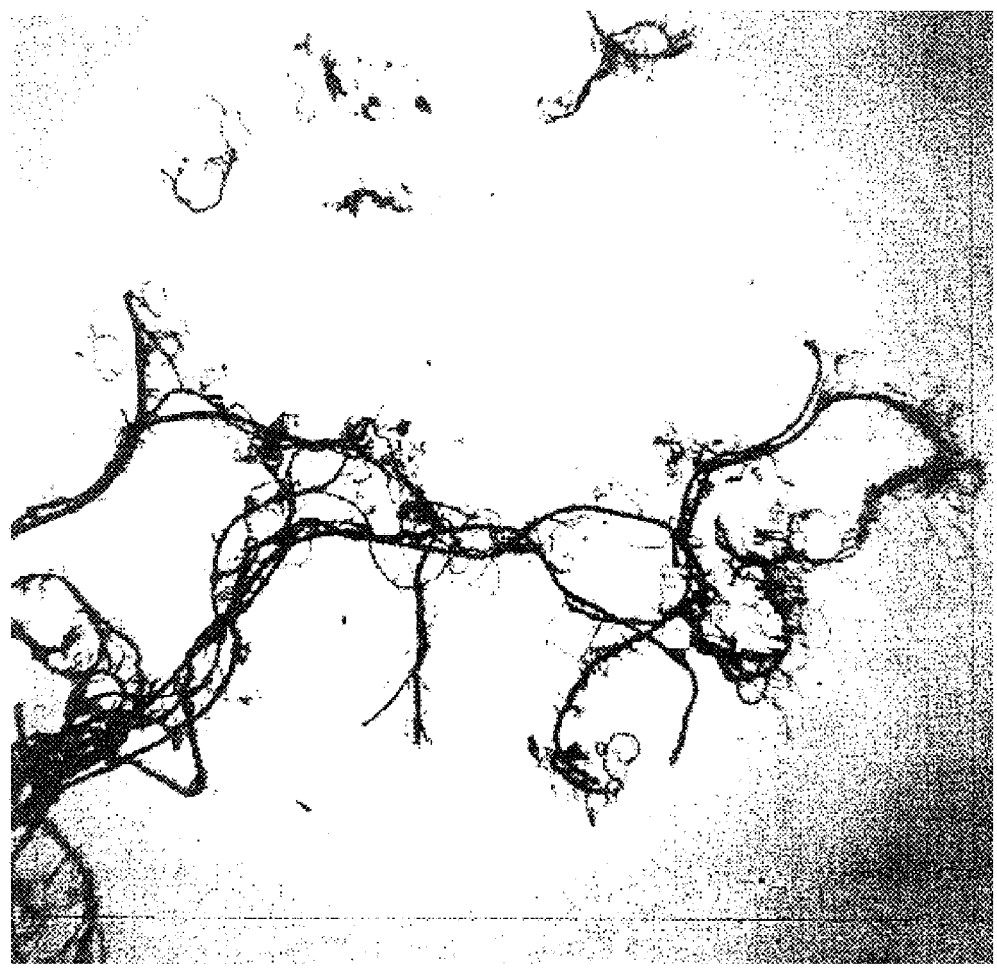

Illustrative embodiments of the present invention will now be more particularly described with reference to drawings, where FIG. 1 is a micrograph of a fibrillated hemp fibre, FIG. 2 is a micrograph of a mixture of 80% of fibrillate hemp fibres and 20% of fibrillated aramid fibres, FIG. 3 is a micrograph of a mixture of 50% of fibrillate hemp fibres and 50% of fibrillated aramid fibres, FIG. 4 is a micrograph of a conventional fibrillated aramid fibre.

1. FIRST ILLUSTRATIVE EMBODIMENT

In the first illustrative embodiment, the fibres according to the invention are produced using a laboratory mill. The laboratory mill used was a commercially available Moulinex 320 chopper designed for producing powders in the food sector. It was surprisingly found that such a laboratory mill provided particularly good fibrillation of vegetable fibres, especially hemp fibres.

The Moulinex 320 chopper laboratory mill consists of a cylindrical stator and a rotor disposed in the axis of the stator cylinder. Attached to the rotor are two blades which extend radially in the direction of the stator. The blades each have a radial length of about 50 mm and are vertically offset relative to each other by 12 mm. The laboratory mill is especially notable for having inner ribs on the base of the inner surface of the stator, which occur every 10° and which extend along the inner surface and parallel to the rotor axis approximately to the level of the upper blade. It is believed that the particularly good fibrillation of hemp fibres is due to these inner ribs, since a comparable mill without inner ribs provided very much worse fibrillation of hemp fibres. It is further believed that the inner ribs stop the fibre material turning with the blade when the starting fibres are less than 20 mm in length.

In the first illustrative embodiment, the fibres according to the invention were generated by placing hemp fibre material having a shives fraction of less than 10% by weight in the laboratory mill and grinding the hemp fibre material therein for between 30 and 90 sec. The starting hemp fibres used were less than 20 mm in length.

FIG. 1 shows hemp fibres which were fibrillated as described above by grinding with the laboratory mill for 90 sec. The elementary fibres from which individual smaller fibrils branch off are clearly visible. As in the case of aramid fibres, one end of the fibrils is attached to the respective mother elementary fibre.

The fibres produced as per the first illustrative embodiment by 90 sec laboratory milling the base fibres are hereinbelow referred to as A.

2. SECOND ILLUSTRATIVE EMBODIMENT

The second illustrative embodiment utilized a commercial grinder from Altenburger Maschinen Jäckering GmbH (Ultrarotor model type IIIa, 75 kw). Such a grinder is described in DE 35 43 370 A1. In this grinder, the millbase particles are accelerated to a high speed within a multiplicity of air eddies generated by the grinding plates. It is believed that the interaction of the millbase particles is responsible the grinding effect. More particularly, the grinding is only minimally due to the collision of the millbase particles with the stationary and rotating machine components. For this reason, the grinding apparatus used is referred to herein as an eddied air grinder.

Surprisingly, the fibrillated fibres produced using the laboratory mill can be reproduced using this grinder and even improved using modified settings of the grinder.

The starting material for producing the reinforcing and/or process fibres of the invention can be organic natural fibres or vegetable fibres, for example flax, hemp, sisal, jute or ramie fibres. It is particularly advantageous to use ultrasonicated hemp as a starting material. The fraction of shives therein is generally less than 10% by weight. The starting material was less than 20 mm in length. A further possible starting material is a fibre-shives mixture, in which case the shives fraction can be between 10% by weight and 95% by weight.

Three different fibrillated fibres were produced from hemp as per the second illustrative embodiment. The fibres were each ground in the grinder at different underpressures. The underpressure, i.e. the pressure difference from atmospheric pressure, was 45 mbar in the case of fibre B1, 25 mbar in the case of fibre B2 and 12 mbar in the case of fibre B3. The underpressure causes the fibre material to be conveyed through the grinder, so that the residence time of the fibre material in the grinder is shorter at higher underpressure. For instance, the residence time was about 1 sec in the case of a pressure of 12 mbar below atmospheric pressure and ½ sec or less in the case of underpressures of 25 and 45 mbar. The temperature in the grinder was never higher than 20° C. throughout the grinding operation

3. COMPARTIVE EXAMPLE C

Comparative Example C utilized fibrillated fibres from Schwarzwälder Textilwerke Heinrich Kautzmann GmbH of Schenkenzell, the starting material used again being ultrasonicated hemp fibres. The results of the investigation are shown in Table 1.

4. COMPARISON OF INVENTIVE FIBRES WITH COMPARATIVE EXMAPLES C

To characterize the fibres of the invention and compare them with the comparative fibres, the fibrillated fibres were examined under a microscope. The microscope used was from Carl Zeiss Jena ("Citoval 2" binocular; 16 times ocular; lens: zoom 0.63 to 6.3 times). The scale was defined using an ocular micrometer. The geometric dimensions of the fibres and fibrils were estimated semiquantitatively, the accuracy (one sigma) being estimated at 25%, based on the respective measured value. The magnification used was 10:1 for measuring the fibre lengths (1.0 times lens) and 50:1 for measuring the fibre diameters (5.0 times lens).

The terms used to characterized the fibrillated fibres will now be defined.

Fibre Bundles:

"Fibre bundles", as used herein, comprehends two or more at least partially connected elementary fibres. The diameter of a fibre bundle is on the order between 0.04 mm to 0.4 mm with 80 area per cent of the inspected fibres lying in this range. In the case of diameters greater than 0.15 mm, the cross section of the fibre bundle is oval, and the diameter reported is the largest transverse dimension.

Elementary Fibres:

Elementary fibres are individual fibres with 80 area per-cent of the examined fibres having a diameter between 0.01 mm to 0.03 mm. Biologically, an elementary fibre is a cell.

Fibrils:

Fibrils are for the purposes of the comparison conducted herein fibres which are attached at one end to a less fine elementary fibre and whose diameter is in the range between 0.002 mm and 0.01 mm and whose length is between 0.01 mm and 0.1 mm with again in each case 80 area percent of the inspected fibrils lying in this range.

Degree of Fibrillation:

The degree of fibrillation indicates which fraction of the length of an elementary fibre has fibrils. To determine the degree of fibrillation, an elementary fibre is divided into regions 1 mm in length in the course of the examination under the microscope. It is then determined whether a region 1 mm in length does or does not contain at least one fibril. The degree of fibrillation is then the number of 1 mm long regions with fibrils divided by the total number of regions examined. The degree of fibrillation is accordingly 100% when there is at least one fibril on the elementary fibre after every 1 mm. When fibrils occur at intervals greater than 1 mm along the elementary fibre, the degree of fibrillation is less than 100%.

Fraction of Fibrils:

The measurement of the fibril fraction is to provide a more accurate method for determining the fibrillation of an elementary fibre. To determine the fibril fraction, elementary fibres are examined under the microscope. A micrograph is examined to determine the area occupied by the fibrils and the area occupied by the elementary fibres. The fibril fraction in area percent is the area of the fibrils divided by the sum total of the areas occupied by the fibrils and by the elementary fibres.

The fibril fraction in area percent can be converted into a fibril fraction in percent by weight by means of the following formula:

$$\frac{a}{a+d(1-a)}$$

where a is the fibril fraction in area percent and d is the ratio of the diameter of the elementary fibre to the diameter of the fibril. For the conversion it is assumed as an approximation that the fibrils and the elementary fibres have the same density and each have the same diameter over their entire length.

Furthermore, the reported "80%" after a feature in Table 1 denotes that 80 area percent of the examined fibres or fibrils lie within the stated range.

Specific surface area according to Blaine-Dyckerhoff:

In addition, the specific surface area of the fibres was determined according to Blaine-Dyckerhoff. The measurement was carried out using an air permeability method according to Blaine (DIN EN 196 Edition 3.90 Part 6). The procedure is as follows:

First the density Dd of the fibres to be measured is determined. In the case of cellulose fibres, this density Dd is generally between 1.2 and 1.5 g/cm$^3$, typically 1.4 g/cm$^3$. From this density and the volume Vd available in the measuring cell follows the mass Md of the fibre material to be measured, as Md=Dd·Vd·e, where e is the porosity. The porosity is defined as the ratio of the pore volume to the total volume. Here the porosity is 0.500. In the measuring cell, the fibre material is pressed cold between two round filters until the measuring cylinder can be completely closed. The method of measurement then determines the time which a certain amount of gas (generally air) needs to flow through the fibre material in the measuring cell at a predetermined initial underpressure. The time is taken which the surface of liquid in a U-tube manometer communicating with one end of the measuring cell needs to pass through a defined height difference.

The specific surface area according to Blaine-Dyckerhoff is then calculated as follows:

$$SS = \sqrt{t}\,\frac{c}{Dd}$$

where c is a coefficient determined by calibration.

The above-indicated DIN method envisages a fixed value of 0.500 for the porosity. If the volume of the measuring cell is not sufficient for the fibre material used, so that the fibre material mass calculated from the density and the volume of the measuring cell is in fact smaller, the porosity is calculated as follows:

$$e = 1 - Md/(Vd \cdot Dd)$$

The specific surface area according to Blaine-Dyckerhoff is then obtained as follows:

$$SS = \frac{\sqrt{t} \cdot c\sqrt{2e^3}}{(1-e) \cdot Dd} \text{ (in cm}^2\text{/g)}.$$

The Blaine-Dyckerhoff surface area correlates with the actual specific surface area, and the actual specific surface area can be accurately determined exactly by normalization against a reference standard having a known specific surface area. However, the measurements reported in the table hereinbelow have not been normalized, but indicate the specific surface area according to Blaine-Dyckerhoff.

The measurements were carried out using a Blaine air permeability tester from Toni Technik of Berlin (ToniPERM model).

The above-indicated coefficient c determined by calibration was about 1.200 sec$^{-1/2}$ cm$^{-1}$ for this instrument.

Table 1 hereinbelow summarizes the results of the measurements.

TABLE 1

| Fibrillated fibre: | A | B1 | B2 | B3 | C |
|---|---|---|---|---|---|
| 1. Shives and fibre bundles: | | | | | |
| Fraction of total area of fibre material accounted for by shives and other nonfibres | 2 area % | 2 area % | 1 area % | <1 area % | <1 area % |
| Fraction of total area of fibre material accounted for by fibre bundles | 28 area % | 48 area % | 29 area % | 10 area % | 50 area % |
| 2. Elementary fibres | | | | | |
| Fraction of total area of fibre material accounted for by elementary fibres | 70 area % | 50 area % | 70 area % | 90 area % | 50 area % |
| Length range of elementary fibre fragments after grinding (80%) | 1–5 mm | 1–8 mm | 1–4 mm | 1–3 mm | 1–4 mm |
| Average length of elementary fibres | 3.5 mm | 4 mm | 2.5 mm | 1.5 mm | 2 mm |
| Degree of fibrillation | 95% | 90% | 95% | 100% | 85% |
| Fraction of fibrils (area percent) | 10 area % | 5 area % | 10 area % | 20 area % | 3 area % |
| Fraction of fibrils (wt. %) | 2.2 wt. % | 1.0 wt. % | 2.2 wt. % | 4.8 wt. % | 0.6 wt. % |
| Specific surface area to Blaine-Dyckerhoff | 4000–7000 cm$^2$/g | 3000–5000 cm$^2$/g | 4000–7000 cm$^2$/g | 5000–10000 cm$^2$/g | 2000–4000 cm$^2$/g |

It is noted that, in the starting material, the degree of fibrillation was less than 20 percent and the fibril fraction of an elementary fibre was less than 1 area percent or 0.2 weight percent. It follows that the fibres B1, B2, B3 and A according to the invention all have a higher degree of fibrillation and a higher fibril fraction for an elementary fibre than the comparative fibre C. The comparison between the fibres produced according to illustrative embodiment 1 (A) and according to illustrative embodiment 2 (B1, B2, B3) shows that the degree of fibrillation obtained is consistently similar, the degree of fibrillation and the fibril fraction being improvable in the case of the grinder used in illustrative embodiment 2 by grinding at lower underpressure; that is, by extending the residence time of the fibres in the grinder.

Comparing the respective specific surface areas according to Blaine-Dyckerhoff for the fibrillated fibres, it is again found that the specific surface area according to Blaine-Dyckerhoff is larger for the fibres produced according to the invention than for the comparative fibre C. Fibre B3 produced according to the invention even approaches the specific surface area according to Blaine-Dyckerhoff for fibrillated aramid fibres, which is between 7000 cm$^2$/g and 12000 cm$^2$/g.

However, the specific surface area must always be viewed in connection with the average length of the elementary fibres, since a high specific surface area can also be created by substantially shortened attrited elementary fibres. In this case, however, a different fibre variety is present, possibly comprising fibre fragments having a very small diameter but no fibrils having a small diameter which are attached to their mother elementary fibres having a larger diameter. So the specific surface area according to Blaine-Dyckerhoff is only of limited informativeness with regard to fibrillation.

5. BLENDING OF INVENTIVE FIBRES WITH FIBRILLATED ARAMID FIBRES

The fibrillated fibres according to the invention can be used as reinforcing or process fibres. More particularly, the fibres according to the invention are useful in gaskets and friction linings and also in composite materials, for example in the plastics and building materials sectors.

Furthermore, the fibrillated fibres according to the invention are very useful for producing fibre blends with straight fibrillated aramid fibres. Such blend fibres possess a particularly high strength and an almost identical fibril structure to straight aramid fibres, so that they too can be used in gaskets and friction linings for example. The fibrillated vegetable fibres can be present in the mixture in a weight fraction of 10% to 90%, and a fraction between 50% and 80% has been determined as particularly advantageous. FIGS. 2 and 3 depict micrographs of such blend fibres, the blend of FIG. 2 containing 20 weight percent of fibrillated aramid fibres and 80 weight percent of fibrillated hemp fibres and the blend of FIG. 3 containing equal weight fractions of fibrillated aramid fibres and fibrillated hemp fibres. The scale is the same in all photographs. It follows from FIG. 4.

6. FIBRE-SHIVES MIXTURES

Furthermore, fibre-shives mixtures can be fibrillated according to the invention. Such mixtures are more economical than the use of straight fibres as a starting material and are advantageous in specific applications where additional fillers are desired.

Shives are the woody fibre plant constituents which do not contain bast fibres.

The fibre-shives mixture is used as a starting material for the fibrillation described in the first and second illustrative embodiments. The fibrillation provides fibrillated elementary fibres of the plants or organic natural fibres on the one hand and ground shives on the other. To obtain substantially shive-free reinforcing or process fibres, the shives fraction of the starting material can be below 10% by weight, advantageously below 2% by weight. When a higher shives fraction is desired, for example as an additional filler, it is typically between 25% by weight and 75% by weight (whole plant). Generally the shives fraction can be between 0% by weight and 95% by weight.

Friction Linings

Friction linings, as well as the fibres according to the invention, generally comprise organic and/or inorganic fillers, lubricating materials, organic binders and/or metals or metal compounds. Friction linings generally contain about 0 to 70% by weight, especially 1 to 70% by weight, of metals, about 3 to 50% by weight of fillers, about 10 to 45% by weight of lubricating materials and about 3 to 25% by weight of fibres. Useful lubricating materials include for example graphite, molybdenum disulphide, antimony trisulphide, lead sulphide or tin sulphides (SnS, SnS$_2$, Sn$_2$Sn$_3$(Sn(II)(IV) mixed sulphide)). When tin sulphides are used as lubricating materials, they are generally present in an amount of 0.5 to 90% by weight, preferably 1 to 60% by weight, particularly preferably 2 to 30% by weight and especially 2 to 8% by weight, based on the total amount of the lubricating materials, and tin sulphide is preferably used as the sole metal sulphide in the lubricant group.

The fibres according to the invention can accordingly be included in additives for friction linings, especially in conjunction with tin sulphides as lubricating materials. The weight fraction of the fibres according to the invention in such additives is between 5 and 95% by weight, advantageously between 30 and 70% by weight.

The invention claimed is:

1. Process for producing reinforcing and/or process fibres based on vegetable fibres, characterized in that the fibre material is ground in an eddied air grinder, whereby elementary fibres of the vegetable fibres are fibrillated.

2. Process according to claim 1, characterized in that the fibre material was ultrasonicated before grinding.

3. Process according to claim 1, characterized in that the starting material used is a fibre-shives mixture.

4. Process according to claim 1, wherein the vegetable fibres are based on flax, hemp, sisal, jute or ramie fibres.

5. Process according to claim 2, wherein the vegetable fibres are based on flax, hemp, sisal, jute or ramie fibres.

6. Process according to claim 3, wherein the vegetable fibres are based on flax, hemp, sisal, jute or ramie fibres.

7. Process according to claim 3, wherein the weight fraction of the shives is less than 10%.

8. Process according to claim 3, wherein the weight fraction of the shives is between 25 and 75%.

9. Process for producing reinforcing and/or process fibres based on vegetable fibres, characterized in that the fibre material is ground in an eddied air grinder, in which millbase particles are accelerated to a high speed within a multiplicity of air eddies generated by the grinding plates of the grinder.

10. The fibres produced by the process of claim 9.

* * * * *